(12) United States Patent
Liu

(10) Patent No.: US 9,497,598 B2
(45) Date of Patent: Nov. 15, 2016

(54) SERVICE INFORMATION PUSHING AND RECEIVING METHOD, AND RELATED APPARATUS AND SYSTEM

(71) Applicant: Huawei Device Co., Ltd., Shenzhen (CN)

(72) Inventor: Haibo Liu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 139 days.

(21) Appl. No.: 14/136,367

(22) Filed: Dec. 20, 2013

(65) Prior Publication Data

US 2014/0105097 A1    Apr. 17, 2014

Related U.S. Application Data

(63) Continuation of application No. PCT/CN2012/087466, filed on Dec. 26, 2012.

(30) Foreign Application Priority Data

Dec. 30, 2011  (CN) .......................... 2011 1 0455686

(51) Int. Cl.
*H04B 7/00*   (2006.01)
*H04W 4/06*   (2009.01)
*H04W 4/12*   (2009.01)

(52) U.S. Cl.
CPC ................. *H04W 4/06* (2013.01); *H04W 4/12* (2013.01)

(58) Field of Classification Search
CPC  H04W 76/002; H04W 76/022; H04W 92/10
USPC ............... 370/310, 328, 329, 349, 431, 432
See application file for complete search history.

(56) References Cited

U.S. PATENT DOCUMENTS 6,934,299 B2 *  8/2005  Kaatz ................ H04W 52/0216
                                                          370/432
8,588,191 B2 * 11/2013  Mathur et al. ................ 370/338
(Continued)

FOREIGN PATENT DOCUMENTS

| CN | 101044714 A | 9/2007 |
| CN | 101743771 A | 6/2010 |

(Continued)

OTHER PUBLICATIONS

Chandra, Beacon-Stuffing: WiFi without associations, IEEE, 2007, pp. 53-57.*

(Continued)

*Primary Examiner* — Dmitry H Levitan
(74) *Attorney, Agent, or Firm* — Conley Rose P.C.

(57) ABSTRACT

Embodiments of the present invention disclose a service information pushing and receiving method, and a related apparatus and system. The service information pushing method includes: obtaining, by a radio access point (AP), service information provided by a service provider, adding the service information to a beacon frame, and broadcasting the beacon frame. A method for receiving pushed service information includes: obtaining, by a terminal, a beacon frame that carries service information, and extracting and outputting the service information in the beacon frame. The technical solution provided by the present invention enables a terminal to receive service information in a Wi-Fi network without accessing the network.

22 Claims, 3 Drawing Sheets

(56) References Cited

U.S. PATENT DOCUMENTS

| | | | |
|---|---|---|---|
| 8,958,354 B2* | 2/2015 | Das et al. | 370/312 |
| 9,125,024 B2* | 9/2015 | Hua | H04W 4/06 |
| 9,125,215 B2* | 9/2015 | Bahr | H04W 74/0816 |
| 2007/0242643 A1* | 10/2007 | Chandra et al. | 370/338 |
| 2008/0151796 A1* | 6/2008 | Jokela | H04W 48/08 370/310 |
| 2009/0175250 A1 | 7/2009 | Mathur et al. | |
| 2010/0085922 A1* | 4/2010 | Dhanapal et al. | 370/329 |
| 2010/0202339 A1* | 8/2010 | Chieng et al. | 370/312 |
| 2010/0202423 A1* | 8/2010 | Karaoguz | G06Q 30/0241 370/338 |
| 2010/0232337 A1 | 9/2010 | Das et al. | |
| 2011/0151840 A1* | 6/2011 | Gong et al. | 455/414.1 |
| 2013/0163425 A1* | 6/2013 | Hughes | H04W 76/002 370/235 |
| 2013/0279381 A1* | 10/2013 | Sampath et al. | 370/311 |

FOREIGN PATENT DOCUMENTS

| | | |
|---|---|---|
| CN | 102196432 A | 9/2011 |
| CN | 102546792 A | 7/2012 |
| JP | 2006245906 A | 9/2006 |
| JP | 2009533954 A | 9/2009 |
| JP | 2012520627 A | 9/2012 |
| WO | 2007052137 A2 | 5/2007 |
| WO | 2007120447 A1 | 10/2007 |
| WO | 2008059285 A1 | 5/2008 |
| WO | 2010105192 A1 | 9/2010 |

OTHER PUBLICATIONS

"Part 11: Wireless LAN Medium Access Control (MAC) and Physical Layer (PHY) Specifications," IEEE Standards Association, IEEE Computer Society, IEEE Std 802.11, Mar. 29, 2012, 2793 pages.

Partial English Translation and Abstract of Chinese Patent Application No. CN102196432A, Feb. 12, 2014, 5 pages.

Foreign Communication From a Counterpart Application, PCT Application No. PCT/CN2012/087466, English Translation of International Search Report dated Mar. 28, 2013, 3 pages.

Foreign Communication From a Counterpart Application, PCT Application No. PCT/CN2012/087466, English Translation of Written Opinion dated Mar. 28, 2013, 9 pages.

Foreign Communication From a Counterpart Application, Chinese Application No. 201110455686, Chinese Office Action dated Dec. 10, 2013, 13 pages.

Foreign Communication From a Counterpart Application, European Application No. 12861995.4, Extended European Search Report dated Dec. 22, 2014, 6 pages.

Partial English Translation and Abstract of Japanese Patent Application No. JP2006245906A, Part 1, Apr. 7, 2015, 4 pages.

Partial English Translation and Abstract of Japanese Patent Application No. JP2006245906A, Part 2, Apr. 7, 2015, 7 pages.

Partial English Translation and Abstract of Japanese Patent Application No. JP2009533954A, Part 1, Mar. 27, 2015, 5 pages.

Partial English Translation and Abstract of Japanese Patent Application No. JP2009533954A, Part 2, Mar. 27, 2015, 12 pages.

Partial English Translation and Abstract of Japanese Patent Application No. JP2012520627A, Part 1, Mar. 27, 2015, 3 pages.

Partial English Translation and Abstract of Japanese Patent Application No. JP2012520627A, Part 2, Mar. 27, 2015, 10 pages.

"3rd Generation Partnership Project; Technical Specification Group Core Network and Terminals; Technical realization of Cell Broadcast Service (CBS) (Release 8)," 3GPP TS 23.041, V8.6.0, Jun. 2010, 44 pages.

Foreign Communication From a Counterpart Application, Japanese Application No. 2014519408, Japanese Office Action dated Feb. 10, 2015, 3 pages.

Foreign Communication From a Counterpart Application, Japanese Application No. 2014519408, English Translation of Japanese Office Action dated Feb. 10, 2015, 4 pages.

* cited by examiner

SERVICE INFORMATION PUSHING AND RECEIVING METHOD, AND RELATED APPARATUS AND SYSTEM

CROSS-REFERENCE TO RELATED APPLICATIONS

This application is a continuation of International Application No. PCT/CN2012/087466, filed on Dec. 26, 2012, which claims priority to Chinese Patent Application No. 201110455686.X filed on Dec. 30, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of communications, and in particular, to a service information pushing and receiving method, and a related apparatus and system.

BACKGROUND

With the popularization of Wireless Fidelity (Wi-Fi) equipment, more and more businesses try to adopt a wireless broadband Wi-Fi network to push service information (such as advertisement information, earthquake early warning information, a welcome message, and online audio and video information) to a terminal. Currently existing Wi-Fi service information systems are generally implemented in the following manners:

Manner 1: terminal side software is developed to enable a terminal to automatically connect to a Wi-Fi network, so as to obtain service information from a server and present the service information to a client.

Manner 2: when a user selects Wi-Fi access, a radio access point (AP) in the Wi-Fi redirects an access request of the user to a login page of the Wi-Fi network and puts service information on the page.

According to the foregoing two manners, in the technical solutions, the service information cannot be pushed unless a user of a terminal accesses a Wi-Fi network, which results in low pushing efficiency.

SUMMARY

Embodiments of the present invention provide a service information pushing and receiving method, and a related apparatus and system, so that a terminal may receive service information in a Wi-Fi network without accessing the Wi-Fi network.

To solve the foregoing technical problem, the embodiments of the present invention provide the following technical solutions:

A service information pushing method, which includes: obtaining, by a radio AP, service information provided by a service provider, adding the service information to a beacon frame, and broadcasting the beacon frame.

A method for receiving pushed service information, which includes: obtaining, by a terminal, a beacon frame that carries service information, and extracting and outputting the service information in the beacon frame.

A radio access node, which includes: an obtaining unit configured to obtain service information provided by a service provider; a carrier unit configured to add the network service information to a beacon frame; and a broadcast unit configured to broadcast the beacon frame.

A terminal, which includes: an obtaining unit configured to obtain a beacon frame that carries service information; and an extraction and output unit configured to extract and output the service information in the beacon frame.

A network service information pushing system, which includes: a radio access node and a terminal, where the radio access node is configured to: obtain service information provided by a service provider, add the service information to a beacon frame, and broadcast the beacon frame; and the terminal is configured to obtain the beacon frame that carries the service information, and extract and output the service information in the beacon frame.

According to the foregoing description, in the embodiments of the present invention, an AP carries service information to a beacon frame and broadcasts the beacon frame so that a user of a terminal may obtain service information of a Wi-Fi network where the AP is located without accessing the network. In addition, the technical solution provided by the present invention may also implement pushing of advertisement information, thereby solving the problem in the prior art that advertisements cannot be pushed unless a user of a terminal accesses a Wi-Fi network, and improving the advertisement pushing efficiency in a wireless network.

BRIEF DESCRIPTION OF THE DRAWINGS

To describe the technical solutions in the embodiments of the present invention more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

DETAILED DESCRIPTION

Embodiments of the present invention provide a service information pushing and receiving method, and a related apparatus and system.

To make the invention objectives, features, and advantages of the present invention more comprehensible, the following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figure 1A:
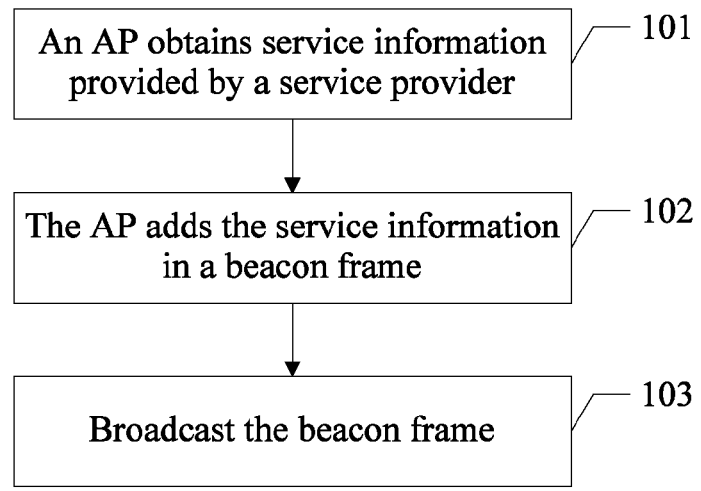
FIG. 1A is a schematic flow chart of an embodiment of a service information pushing method according to the present invention.

A service information pushing method provided in an embodiment of the present invention is described in the following description. Referring to FIG. 1A, the service information pushing method provided in the embodiment of the present invention includes:

101: An AP obtains service information provided by a service provider.

In the embodiment of the present invention, the service provider configures, in the AP, the service information (such as advertisement information, earthquake early warning information, welcome message, and online audio and video information) that needs to be broadcast, so that the AP locally obtains the service information provided by the service provider. Definitely, the AP may also directly obtain the service information provided by the service provider from a server provided by the service provider, which is not limited herein.

102: The AP adds the service information to a beacon frame.

A frame structure of a beacon frame defined by the 802.11 protocol is shown in Table 1:

TABLE 1

| FC | Duration | DA | SA | Bss ID | SC | Frame body | FCS |
|---|---|---|---|---|---|---|---|

FC, Duration, DA, SA, Bss ID and Seq are fields in a frame header. FC is a frame control field with a size of two bytes, and is used to indicate a protocol version of a beacon frame, whether the frame is a retransmitted frame, and the like. A Duration value is used for network allocation vector calculation, and has a size of two bytes. DA is a destination address field with a size of six bytes and is used to indicate an address of a receiving station, where DA in the embodiment of the present invention is a broadcast address. SA is a source address field with a size of six bytes, where the first three bytes indicate an address assigned to a manufacturer by Institute of Electrical and Electronics Engineers (IEEE), and this field is used to indicate a working station that sends a beacon frame; SA in the embodiment of the present invention is an address of an AP that sends a beacon frame. Bss ID is an identifier of basic service device with a size of six bytes. SC is a sequence control field with a size of two bytes, consists of a segment number and a sequence number, and is used to indicate sequences of different segments in the same frame and identify a data packet copy. Frame body is a frame body with a size of 0 to 2312 bytes. The FCS field is used to carry calculated cyclic redundancy check code.

Figure 1B:
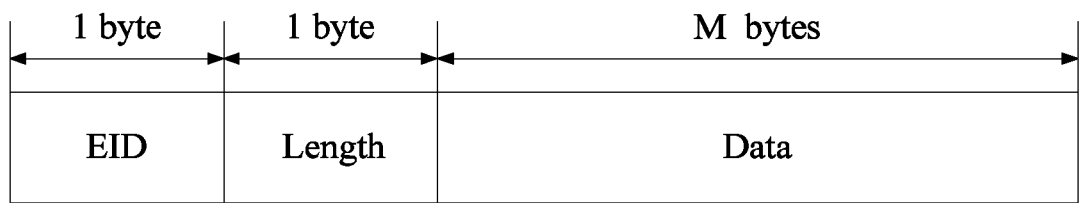
FIG. 1B is a schematic diagram of a frame structure of a beacon frame that carries service information according to the present invention.
Figure 1C:
FIG. 1C is a schematic diagram of another frame structure of a beacon frame that carries service information according to the present invention.

In the embodiment of the present invention, the service information may be added in a frame body of a beacon frame in the following manner:

An optional variable length parameter is added to the frame body of the beacon frame, and the format of the parameter may be defined according to the 802.11 standard. As shown in FIG. 1B, an element identity (EID) of the variable length parameter is a newly-defined value with a size of one byte, which is different from a value already defined in 802.11. For example, an undefined value in current reserved values 11 to 15, 43 to 49, and 32 to 255 in 802.11 may be selected as an EID of the service information. The Length parameter is used to indicate a length of broadcasted data, and the data length is equal to M bytes, where M is equal to a Length parameter value, that is, when M is 200, it means that data with a maximum of 200 bytes may be carried. The 802.11 standard defines that the size of the Length parameter in a beacon frame is 1 byte, namely, a maximum value of M is 255. Therefore, in this solution, the beacon frame may carry service information with a size of a maximum of 255 bytes. Alternatively, as shown in FIG. 1C, in the embodiment of the present invention, the length of the Length parameter may be modified to 2 bytes by modifying AP and terminal protocols, and then, the maximum value of M is 65535. Hence, the beacon frame may carry service information with a size of a maximum of 65535 bytes. Of course, in the embodiment of the present invention, the length of the Length parameter may also be modified to a larger value so that the beacon frame may carry more service information, which is not limited herein.

The 802.11 standard defines a Beacon Interval parameter of the beacon frame, and the parameter is used to indicate how frequently an AP broadcasts beacon frames. For example, if the Beacon Interval parameter value of beacon frames is set to 100, it indicates that the AP broadcasts a beacon frame every 100 milliseconds (ms).

The AP broadcasts beacon frames periodically; therefore, in an application scenario, the beacon frame that carries the service information may carry a service information indicator, where the service information indicator is used to indicate to a terminal that the beacon frame carries the service information, so that the terminal may obtain only the beacon frame that carries the service information indicator. In the embodiment of the present invention, a mandatory fixed length parameter may be added to a frame body of the beacon frame, and a value of the fixed length parameter may be defined as the service information indicator. For example, the value 0 of the fixed length parameter may be defined as the service information indicator, that is, when the value of the fixed length parameter in a beacon frame is 0, it indicates that the beacon frame carries the service information, and the terminal extracts the service information from the beacon frame when receiving the beacon frame; if the value of the fixed length parameter in a beacon frame is not 0, it indicates that the beacon frame does not carry the service information, and the terminal does not extract the service information from the beacon frame.

In another application scenario, a currently broadcast beacon frame may also carry a time interval indication parameter, where the time interval indication parameter is used to indicate to a terminal a broadcast interval between a next beacon frame that carries the service information and the currently broadcast beacon frame, so that the terminal may obtain the next beacon frame that carries the service information according to the broadcast interval. In the embodiment of the present invention, a mandatory fixed length parameter may be added to a frame body of the beacon frame to serve as the time interval indication parameter. For example, when the value of the time interval indication parameter is 1, it indicates that the next beacon frame carries the service information, and if the value of the time interval indication parameter is 2, it indicates that the next beacon frame does not carry the service information, and a beacon frame following the next beacon frame carries the service information; the rest may be deduced by analogy.

The introduction of the time interval indication parameter enables the AP to control a broadcast frequency of beacon frames that carry service information, and also enables the terminal to selectively receive beacon frames broadcast by the AP according to the time interval indication parameter.

In another application scenario, the service information may be divided into multiple data segments, and the data segments of the service information are broadcast by using multiple beacon frames. The AP carries a segment quantity indication parameter in the beacon frames that carry the data segments of the service information, so as to indicate to the terminal the number of data segments of the service information to be broadcast. In the embodiment of the present invention, a mandatory fixed length parameter may be added to a frame body of the beacon frame to serve as the segment quantity indication parameter. It is defined that when the value of the segment quantity indication parameter is 1, it indicates that the service information has only one remaining data segment to be broadcast; when value of the segment quantity indication parameter is 2, it indicates that the service information has two remaining data segments to be broadcast; and the rest may be deduced by analogy. With the introduction of the segment quantity indication parameter, the service information may be divided into multiple data segments and carried in different beacon frames for broadcast transmission, so that the AP can broadcast a larger amount of service information. Furthermore, the AP may also carry segment location indication information in the beacon frame that carries the data segment of the service information, so as to indicate to the terminal where the data segment in the beacon frame is located in the service information. Definitely, the AP may not carry segment location indication information in beacon frames, but sequentially broadcasts the beacon frames that carry the data segments according to the location of each data segment in the service information, which is not limited herein.

In another application scenario of the embodiment of the present invention, a service type identifier and a service provider identifier of the service information are carried in the beacon frame that carries the service information, where the service type identifier is used to indicate a type of the service information (for example, discount information, advertisement information, earthquake early warning information, or weather forecast information), and the service provider identifier may enable a terminal to learn a service provider (for example, MCDONALD'S, KFC) of the service information, so that the terminal may determine whether to obtain the beacon frame broadcast by the AP according to the service type identifier and the service provider identifier in the beacon frame.

103: Broadcast the beacon frame.

After steps 101 and 102, the AP broadcasts the beacon frame that carries the service information, so that a terminal within a coverage range of the AP may obtain the beacon frame.

Furthermore, a service provider may also configure, in the AP, a broadcast parameter (such as a broadcast frequency of the service information) related to the service information, so that the AP broadcasts the beacon frame that carries the service information according to the parameter configured by the service provider.

The service information in the embodiment of the present invention may be in the format of audio, video, Flash, image, Hypertext Transfer Protocol (HTTP), Extensible Markup Language (XML), or the like, which is not limited herein.

According to the foregoing description, in the embodiment of the present invention, an AP adds service information to a beacon frame and broadcasts the beacon frame so that a user of a terminal may obtain service information of a Wi-Fi network where the AP is located without accessing the network. In addition, the technical solution provided by the present invention may also implement advertisement information pushing, thereby solving the problem in the prior art that advertisement cannot be pushed unless a user of a terminal accesses a Wi-Fi network, and improving the advertisement pushing efficiency in a wireless network.

Figure 2:
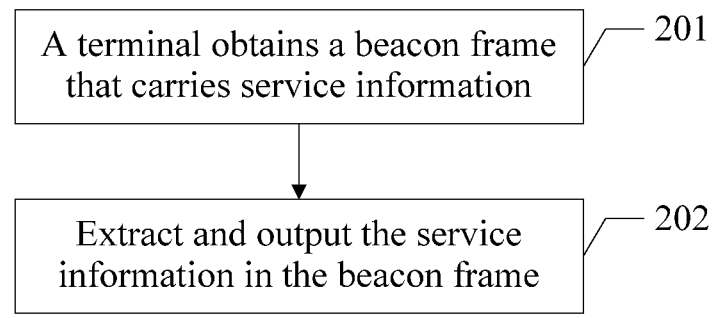
FIG. 2 is a schematic flow chart of another embodiment of a service information pushing method according to the present invention.

A terminal is used as an object in the following description to describe a service information pushing method in the embodiment of the present invention. As shown in FIG. 2, the method includes:

201: A terminal obtains a beacon frame that carries service information.

When entering a coverage area of an AP, the terminal may receive the beacon frame that carries the service information and is broadcast by the AP.

In an application scenario, the AP carries a service information indicator in the beacon frame that carries the service information, where the service information indicator is used to indicate to the terminal that the beacon frame carries the service information. The terminal may obtain the beacon frame that carries the service information by identifying the service information indicator, that is, when a beacon frame does not carry a service information indicator, the terminal may determine not to obtain the beacon frame.

In another application scenario, the AP carries a time interval indication parameter in a currently broadcast beacon frame, where the time interval indication parameter is used to indicate to the terminal a broadcast interval between a next beacon frame that carries the service information and the currently broadcast beacon frame, so that the terminal may obtain the next beacon frame that carries the service information according to the broadcast interval.

In another application scenario, the AP divides the service information into multiple data segments, the data segments of the service information are broadcast by using multiple beacon frames, and a segment quantity indication parameter is carried in the beacon frames that carry the data segments of the service information, where the segment quantity indication parameter is used to indicate to the terminal the number of data segments of the service information to be broadcast, so that the terminal may obtain all the beacon frames that carry the data segments of the service information according to the segment quantity indication parameter carried in the beacon frames.

In another application scenario, the AP carries a service type identifier and a service provider identifier of the service information in the beacon frame that carries the service information. A user of the terminal may set the terminal so that the terminal receives a beacon frame that carries service information or does not receive a beacon frame that carries service information, or receives only service information of a specific service type provided by a specific service provider (for example, only receiving discount information and not receiving advertisement information, or only receiving KFC advertisement information and not receiving MCDONALD'S advertisement information, and the like).

202: Extract and output the service information in the beacon frame.

After obtaining the beacon frame that carries the service information, the terminal (namely, a station) extracts and outputs the service information in the beacon frame, for example, outputting the service information to a display screen so that a user of the terminal may see the service information.

In an application scenario of the present invention, the beacon frame carries the segment quantity indication parameter, and the terminal may extract all data segments of the service information according to the segment quantity indication parameter after receiving a beacon frame that carries the last data segment of the service information, restore all the data segments into complete service information, and output the complete service information. Furthermore, the beacon frame may further carry segment location indication information, and the segment location indication information is used to indicate where the data segment in the beacon frame is located in the service information. After receiving the beacon frame that carries the last data segment of the service information, the terminal may restore all the extracted data segments into complete service information according to the segment location indication information in the beacon frames, and output the complete service information. Definitely, the terminal may also restore all the extracted data segments into complete service information according to a time sequence relationship of the obtained beacon frames, and output the complete service information, which is not limited herein.

According to the foregoing description, in the embodiment of the present invention, service information is carried in a beacon frame and broadcast, so that a user of a terminal may obtain service information of a Wi-Fi network where the AP is located without accessing the network. In addition, the technical solution provided by the present invention may also implement advertisement information pushing, thereby solving the problem in the prior art that advertisements cannot be pushed unless a user of a terminal accesses a Wi-Fi network, and improving the advertisement pushing efficiency in a wireless network.

Figure 3:
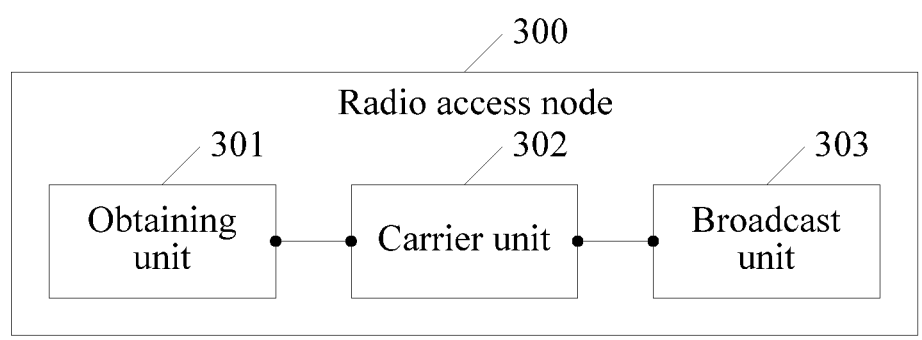
FIG. 3 is a schematic structural diagram of an embodiment of a radio access node according to the present invention.

A radio access node in an embodiment of the present invention is described in the following description. Referring to FIG. 3, a radio access node 300 in the embodiment of the present invention includes an obtaining unit 301, a carrier unit 302, and a broadcast unit 303.

The obtaining unit 301 is configured to obtain service information provided by a service provider.

In the embodiment of the present invention, the service provider configures, in the radio access node 300, the service information (such as advertisement information, earthquake early warning information, welcome information, and online audio and video information) that needs to be broadcast, so that the obtaining unit 301 can locally obtain the service information provided by the service provider. Definitely, the obtaining unit 301 may also directly obtain the service information provided by the service provider from a server provided by the service provider, which is not limited herein.

The carrier unit 302 is configured to add, to a beacon frame, the service information obtained by the obtaining unit 301.

A frame structure of a beacon frame defined by the 802.11 protocol is shown in Table 1.

In the embodiment of the present invention, the carrier unit 302 may add the service information to a frame body of the beacon frame in the following manner:

An optional variable length parameter is added to a frame body of the beacon frame, and the format of the parameter may be defined according to the 802.11 standard. As shown in FIG. 1B, an EID of the variable length parameter is a newly-defined value, which is different from a value already defined in 802.11. For example, an undefined value in current reserved values 11 to 15, 43 to 49, and 32 to 255 in 802.11 may be selected as an EID of the service information. The Length parameter is used to indicate a length of broadcast content, that is, when the value of the Length parameter is 200, it means that content with a maximum of 200 bytes may be carried. The 802.11 standard defines that a size of the Length parameter in a beacon frame is 1 byte. Therefore, in this solution, the beacon frame may carry service information with a size of a maximum of 255 bytes. Alternatively, as shown in FIG. 1C, in the embodiment of the present invention, a length of the Length parameter may be modified to 2 bytes by modifying AP and terminal protocols, and then, the beacon frame may carry service information with a size of a maximum of 65535 bytes. Of course, in the embodiment of the present invention, the length of the Length parameter may also be modified to a larger value so that the beacon frame may carry more service information, which is not limited herein.

The 802.11 standard defines a Beacon Interval parameter of the beacon frame, and the parameter is used to indicate how frequently an AP broadcasts beacon frames. For example, if the Beacon Interval parameter value of beacon frames is set to 100, it indicates that the AP broadcasts a beacon frame every 100 ms.

The AP broadcasts beacon frames periodically; therefore, in an application scenario, the carrier unit 302 may add a service information indicator to the beacon frame that carries the service information, where the service information indicator is used to indicate to a terminal that the beacon frame carries the service information, so that the terminal may obtain only the beacon frame that carries the service information indicator. In the embodiment of the present invention, a mandatory fixed length parameter may be added to a frame body of the beacon frame, and a value of the fixed length parameter may be defined as the service information indicator. For example, the value 0 of the fixed length parameter may be defined as the service information indicator, that is, when the value of the fixed length parameter in a beacon frame is 0, it indicates that the beacon frame carries the service information, and the terminal extracts the service information from the beacon frame when receiving the beacon frame; if the value of the fixed length parameter in a beacon frame is not 0, it indicates that the beacon frame does not carry the service information, and the terminal does not extract the service information from the beacon frame.

In another application scenario, the carrier unit 302 may also add a time interval indication parameter to a currently broadcast beacon frame, where the time interval indication parameter is used to indicate to the terminal a broadcast interval between a next beacon frame that carries the service information and the currently broadcast beacon frame, so that the terminal may obtain the next beacon frame that carries the service information according to the broadcast interval. In the embodiment of the present invention, a mandatory fixed length parameter may be added to a frame body of the beacon frame to serve as the time interval indication parameter. For example, when the value of the time interval indication parameter is 1, it indicates that the next beacon frame carries the service information, and if the value of the time interval indication parameter is 2, it indicates that the next beacon frame does not carry the service information, and a beacon frame following the next beacon frame carries the service information; the rest may be deduced by analogy. The introduction of the time interval indication parameter enables the AP to control a broadcast frequency of beacon frames that carry service information, and also enables the terminal to selectively receive beacon frames broadcast by the AP according to the time interval indication parameter.

In another application scenario, the service information may be divided into multiple data segments, and the data segments of the service information are broadcast by using multiple beacon frames. The carrier unit 302 carries a segment quantity indication parameter in the beacon frames that carry the data segments of the service information, so as to indicate to the terminal the number of data segments of the service information to be broadcast. In the embodiment of the present invention, a mandatory fixed length parameter may be added to a frame body of the beacon frame to serve as the segment quantity indication parameter. It is defined that when the value of the segment quantity indication parameter is 1, it indicates that the service information has only one remaining data segment to be broadcast; when value of the segment quantity indication parameter is 2, it indicates that the service information has two remaining data segments to be broadcast; and the rest may be deduced by analogy. With the introduction of the segment quantity indication parameter, the service information may be divided into multiple data segments and carried in different beacon frames for broadcast transmission, so that the AP can broadcast a larger amount of service information.

In another application scenario of the embodiment of the present invention, the carrier unit 302 may add a service type identifier and a service provider identifier of the service information to the beacon frame that carries the service information, where the service type identifier is used to indicate a type of the service information (for example, discount information, advertisement information, earthquake early warning information or weather forecast information), and the service provider identifier may enable a terminal to learn the service provider (for example, MCDONALD'S, KFC) of the service information, so that the terminal may determine whether to obtain the beacon frame broadcast by the AP according to the service type identifier and the service provider identifier in the beacon frame.

The broadcast unit 303 is configured to broadcast the beacon frame.

Furthermore, the carrier unit 302 may also add segment location indication information to the beacon frame that carries the data segment of the service information, so as to indicate to the terminal where the data segment in the beacon frame is located in the service information. Definitely, the carrier unit 302 may not add segment location indication information to beacon frames, and the broadcast unit 303 sequentially broadcasts the beacon frames that add the data segments according to the location of each data segment in the service information, which is not limited herein.

The service information in the embodiment of the present invention may be in the format of audio, video, flash, image, HTTP, XML, or the like, which is not limited herein.

It should be noted that, like the AP in the foregoing method embodiments, the radio access node 300 in the embodiment of the present invention may be used to implement all the technical solutions in the foregoing method embodiments; functions of all function modules of the radio access node 300 may be specifically implemented according to the methods in the foregoing method embodiments. For a specific implementation process, reference may be made to related descriptions in the foregoing embodiments, which is not described again herein.

According to the foregoing description, in the embodiment of the present invention, the radio access node 300 adds service information to a beacon frame and broadcasts the beacon frame so that a user of a terminal may obtain service information of a Wi-Fi network where the radio access node 300 is located without accessing the network. In addition, the technical solution provided by the present invention may also implement advertisement information pushing, thereby solving the problem in the prior art that advertisements cannot be pushed unless a user of a terminal accesses a Wi-Fi network, and improving the advertisement pushing efficiency in a wireless network.

Figure 4:
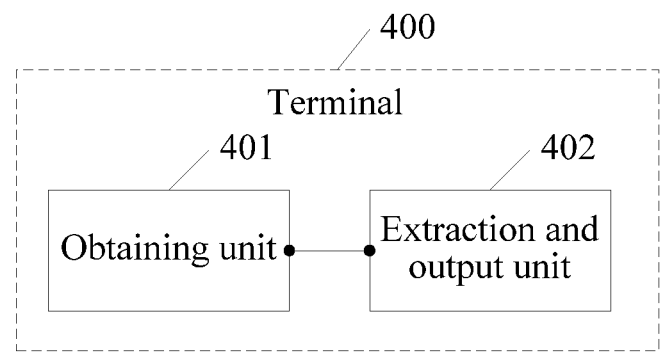
FIG. 4 is a schematic structural diagram of an embodiment of a terminal according to the present invention.

A terminal in an embodiment of the present invention is described in the following description. Referring to FIG. 4, a terminal 400 in the embodiment of the present invention includes an obtaining unit 401 and an extraction and output unit 402.

The obtaining unit 401 is configured to obtain a beacon frame that carries service information.

When entering a coverage area of an AP, the terminal 400 may receive the beacon frame that carries the service information and is broadcast by the AP, and the obtaining unit 401 of the terminal 400 may obtain the beacon frame that carries the service information.

In an application scenario, the beacon frame carries a service information indicator, where the service information indicator is used to indicate to the terminal that the beacon frame carries the service information. The obtaining unit 401 obtains the beacon frame that carries the service information by identifying the service information indicator. For example, if a beacon frame does not carry a service information indicator, the obtaining unit 401 may determine not to obtain the beacon frame.

In another application scenario, the beacon frame carries a time interval indication parameter, where the time interval indication parameter is used to indicate to the terminal a broadcast interval between a next beacon frame that carries the service information and a currently broadcast beacon frame, so that the obtaining unit 401 may obtain the next beacon frame that carries the service information according to the broadcast interval.

In another application scenario, the beacon frame carries a segment quantity indication parameter, where the segment quantity indication parameter is used to indicate to the terminal the number of data segments of the service information to be broadcast, and the obtaining unit 401 may obtain all beacon frames that carry the data segments of the service information according to the segment quantity indication parameter carried in the beacon frame.

In another application scenario, the beacon frame carries a service type identifier and a service provider identifier of the service information. A user of the terminal may set the terminal so that the terminal receives the beacon frame that carries service information or does not receive the beacon frame that carries service information, or receives only a specific type of service information provided by a specific service provider (for example, only receiving discount information and not receiving advertisement information, or only receiving KFC advertisement information and not receiving MCDONALD'S advertisement information, and the like).

The extraction and output unit 402 is configured to extract and output the service information in the beacon frame obtained by the obtaining unit 401.

After the obtaining unit 401 obtains the beacon frame that carries the service information, the extraction and output unit 402 extracts the service information in the beacon frame and outputs the service information, for example, outputting the service information on a display screen so that a user of the terminal may see the service information.

In another application scenario of the present invention, the beacon frame carries the segment quantity indication parameter, and the extraction and output unit 402 may extract all data segments of the service information after the obtaining unit 401 receives a beacon frame that carries the last data segment of the service information according to the segment quantity indication parameter, restore all the data segments into complete service information, and output the complete service information. Furthermore, the beacon frame may further carry segment location indication information, and the segment location indication information is used to indicate where the data segment in the beacon frame is located in the service information. The extraction and output unit 402 may restore all the extracted data segments into complete service information according to the segment location indication information in the beacon frames after the obtaining unit 401 obtains a beacon frame that carries the last data segment of the service information, and output the complete service information. Definitely, the extraction and output unit 402 may also restore all the extracted data segments into complete service information according to a time sequence relationship of the beacon frames obtained by the obtaining unit 401, and output the complete service information, which is not limited herein.

It should be noted that, like the terminal in the foregoing method embodiments, the terminal 400 in the embodiment of the present invention may be used to implement all the technical solutions in the foregoing method embodiments; functions of all function modules of the terminal 400 may be specifically implemented according to the methods in the foregoing method embodiments. For a specific implementation process, reference may be made to related descriptions in the foregoing embodiments, which is not described again herein.

According to the foregoing description, in the embodiment of the present invention, service information is carried in a beacon frame and broadcast, so that a user of a terminal may obtain service information of a Wi-Fi network where the AP is located without accessing the network. In addition, the technical solution provided by the present invention may also implement advertisement information pushing, thereby solving the problem in the prior art that advertisements cannot be pushed unless a user of a terminal accesses a Wi-Fi network, and improving the advertisement pushing efficiency in a wireless network.

Figure 5:
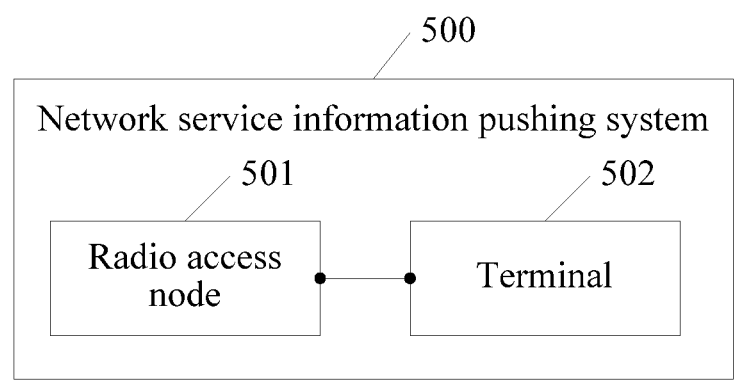
FIG. 5 is a schematic structural diagram of an embodiment of a network service information pushing system according to the present invention.

A network service information pushing system provided by an embodiment of the present invention is described in the following description. Referring to FIG. 5, a network service information pushing system 500 according to the embodiment of the present invention includes: a radio access node 501 and a terminal 502.

The radio access node 501 is configured to: obtain service information provided by a service provider, add the obtained service information to a beacon frame, and broadcast the beacon frame.

The terminal 502 is configured to obtain the beacon frame that carries the service information, and extract and output the service information in the obtained beacon frame.

It should be noted that the radio access node 501 and the terminal 502 may be similar to the radio access node and the terminal in the foregoing apparatus embodiments; for a specific implementation process, reference may be made to related description in the foregoing embodiments, which is not described again herein.

According to the foregoing description, in the embodiments of the present invention, a radio access node adds service information to a beacon frame and broadcasts the beacon frame so that a user of a terminal may obtain service information of a Wi-Fi network where the wireless access node is located without accessing the network. In addition, the technical solution provided by the present invention may also implement advertisement information pushing, thereby solving the problem in the prior art that advertisements cannot be pushed unless a user of a terminal accesses a Wi-Fi network, and improving the advertisement pushing efficiency in a wireless network.

It may be clearly understood by a person skilled in the art that, for the purpose of convenient and brief description, a detailed working process of the foregoing system, apparatus, and unit may refer to the corresponding process in the foregoing method embodiments, and the details will not be described herein again.

In the several embodiments provided in the present application, it should be understood that the disclosed systems, apparatuses, and methods may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium and includes several instructions for instructing a computer device (which may be a personal computer, a server, or a network device) to perform all or a part of the steps of the methods described in the embodiments of the present invention. The foregoing storage medium includes: any mediums capable of storing program code, such as a universal serial bus (USB) flash drive, a removable hard disk, a read-only memory (ROM), a random access memory (RAM), a magnetic disk, or an optical disc.

A service information pushing method, a related device and system provided by the present invention are described in detail above. A person skilled in the art may make alterations to the specific implementation manner and application scope based on the idea of the present invention. In a word, contents of this specification should not be construed as a limitation to the present invention.

What is claimed is:

1. A service information method, comprising:
obtaining, by a radio access point (AP), service information provided by a service provider;
adding a service information indicator having a first state and a second state to a beacon frame, wherein the service information indicator is in the first state when the beacon frame carries the service iformation to indicate to a terminal that the beacon frame carries the service information, and wherein the service information indicator is in the second state when the beacon frame does not carry the service information to indicate to the terminal that the beacon frame does not carry the service information;
adding the service information to the beacon frame;
adding a time interval indication parameter to a currently broadcast beacon frame, wherein the time interval indication parameter is used to indicate o a terminal a broadcast interval between a next beacon frame that carries the service information and the currently broadcast beacon frame, wherein the currently broadcast beacon frame and the next beacon frame are nonconsecutive beacon frames; and
broadcasting the beacon frame.

2. The method according to claim 1, wherein the service information indicator is set in a position of a fixed length parameter of the beacon frame.

3. The method according to claim 1, wherein when the service information is divided into at least two data segments adding the service information to the beacon frame comprises adding the data segments of the service information to beacon frames, wherein one beacon frame carries one data segment, and before broadcasting the beacon frame, the method further comprises adding a segment quantity indication parameter to the beacon frames that carry the data segments of the service information, wherein the segment quantity indication parameter is used to indicate, to a terminal, a number of data segments of the service information to be broadcast.

4. The method according to claim 3, wherein before broadcasting the beacon frame, the method further comprises adding to the beacon frames that carry the data segments of the service information, wherein segment location indication information is used to indicate to the terminal where the data segments in the beacon frames are located in the service information.

5. The method according to claim 1, wherein before broadcasting the beacon frame, the method further comprises adding a service type identifier and a service provider identifier of the service information to the beacon frame that carries the service information such that a terminal selectively obtains the beacon frame according to the service type identifier and the service provider identifier.

6. The method according to claim 1, wherein the broadcast interval of the time interval indication parameter is an integer value of N, and wherein N indicates that the $N^{th}$ beacon frame broadcasted is the next beacon frame that carries the service information.

7. A method for receiving service information, comprising:
obtaining, by a terminal, a beacon frame that carries service information according to a service information indicator and a time interval indication parameter carried in the beacon frame; and
extracting and outputting the service information from the beacon frame,
wherein the service information indicator is in a first state when the beacon frame carries the service information to indicate to the terminal that the beacon frame carries the service information,
wherein the service information indicator is in a second state when the beacon frame does not carry the service information to indicate to the terminal that the beacon frame does not carry the service information,
wherein the time interval indication parameter is used to indicate to the terminal a broadcast interval between a next beacon frame that carries the service information and a currently broadcast beacon frame, and
wherein the currently broadcast beacon frame and the next beacon frame are nonconsecutive beacon frames.

8. The method according to claim 7, wherein the service information indicator is set in a position of a fixed length parameter of the beacon frame.

9. The method according to claim 7, wherein obtaining the beacon frame that carries service information comprises obtaining all beacon frames that carry data segments of the service information according to a segment quantity indication parameter carried in the beacon frames, wherein the segment quantity indication parameter is used to indicate to the terminal a number of data segments of the service information to be broadcast, and wherein extracting and outputting the service information in the beacon frame comprises extracting data segments of the service information in all the beacon frames, and restoring all the extracted data segments of the service information into complete service information and outputting the complete service information.

10. The method according to claim 9, wherein restoring all the extracted data segments of the service information into complete service information and outputting the complete service information comprises restoring, according to segment location indication information in all the beacon frames, all the extracted data segments of the service information into complete service information and outputting the complete service information, wherein the segment location indication information is used to indicate to the terminal where the data segments in the beacon frames are located in the service information.

11. The method according to claim 7, wherein obtaining the beacon frame that carries service information comprises selectively obtaining the beacon frame that carries the service information according to a service type identifier and a service provider identifier in the service information carried in the beacon frame.

12. A radio access node, comprising:
a memory storing executable instructions; and
a processor coupled to the memory and configured to:
obtain service information provided by a service provider;
add the service information, a time interval indication parameter, and a service information indicator to a beacon frame, wherein the service information indicator is in a first state when the beacon frame carries the service information to indicate to a terminal that the beacon frame carries the service information, wherein the time interval indication parameter is used to indicate to a terminal a broadcast interval between a next beacon frame that carries the service information and the beacon frame, wherein the beacon frame and the next beacon frame are nonconsecutive beacon frames, and wherein the service information indicator is in a second state when the beacon frame does not carry the service information to indicate to the terminal that the beacon frame does not carry the service information; and broadcast the beacon frame.

13. The radio access node according to claim 12, wherein the service information indicator is set in a position of a fixed length parameter of the beacon frame.

14. The radio access node according to claim 12, wherein the processor is further configured to:

add the data segments of the service information to beacon frames when the service information is divided into at least two data segments, wherein one beacon frame carries one data segment; and add a segment quantity indication parameter to the beacon frames that carry the data segments of the service information, and wherein the segment quantity indication parameter is used to indicate, to a terminal, a number of data segments of the service information to be broadcast.

15. The radio access node according to claim 14, wherein the processor is further configured to add segment location indication information to the beacon frames that carry the data segments of the service information, and wherein the segment location indication information is used to indicate to the terminal where the data segments in the beacon frames are located in the service information.

16. The radio access node according to claim 12, wherein the processor is further configured to add a service type identifier and a service provider identifier of the service information to the beacon frame that carries the service information such that a terminal selectively obtains the beacon frame according to the service type identifier and the service provider identifier.

17. A terminal, comprising:

a memory storing executable instructions; and a processor coupled to the memory and configured to:

obtain a beacon frame that carries service information according to a service information indicator and a time interval indication parameter carried in the beacon frame, wherein the service information indicator is in a first state when the beacon frame carries the service information to indicate to the terminal that the beacon frame carries the service information, wherein the time interval indication parameter is used to indicate to the terminal a broadcast interval between a next beacon frame that carries the service information and a currently broadcast beacon frame, wherein the currently broadcast beacon frame and the next beacon frame are nonconsecutive beacon frames, and wherein the service information indicator is in a second state when the beacon frame does not carry the service inthr a ion to indicate to the terminal that the beacon frame does not carry the service information; and extract and output the service information from the beacon frame.

18. The terminal according to claim 17, wherein the service information indicator is set in a position of a fixed length parameter of the beacon frame.

19. The terminal according to claim 17, wherein the processor is configured to:

obtain all beacon frames that carry data segments of the service information according to a segment quantity indication parameter carried in the beacon frames, wherein the segment quantity indication parameter is used to indicate to the terminal a number of data segments of the service information to be broadcast;

extract data segments of the service information in all the beacon frames unit;

restore all the data segments of the service information into complete service information; and output the complete service information.

20. The terminal according to claim 19, wherein the processor is further configured to restore, according to segment location indication information in all the beacon frames, all the extracted data segments of the service information into the complete service information and output the complete service information, and wherein the segment location indication information is used to indicate to the terminal where the data segments in the beacon frames are located in the service information.

21. The terminal according to claim 17, wherein the processor is further configured to selectively obtain the beacon frame that carries the service information according to a service type identifier and a service provider identifier in the service information carried in the beacon frame.

22. A network service information system, comprising:

a radio access node configured to:

obtain service information provided by a service provider;

add the service information, a time interval indication parameter, and a service information indicator to a beacon frame; and broadcast the beacon frame, wherein the service information indicator is in a first state when the beacon frame carries the service information, wherein the time interval indication parameter is used to indicate to a terminal a broadcast interval between a next beacon frame that carries the service information and the beacon frame, wherein the beacon frame and the next beacon frame are nonconsecutive beacon frames, and wherein the service information indicator is in a second state when the beacon frame does not carry the service information; and a terminal configured to:

obtain the beacon frame that carries the service information; and extract and output the service information from the beacon frame.

* * * * *

UNITED STATES PATENT AND TRADEMARK OFFICE
CERTIFICATE OF CORRECTION

PATENT NO.         : 9,497,598 B2
APPLICATION NO.    : 14/136367
DATED              : November 15, 2016
INVENTOR(S)        : Haibo Liu It is certified that error appears in the above-identified patent and that said Letters Patent is hereby corrected as shown below:

In the Claims

Column 13, Lines 8 and 19, Claim 1 should read:
A service information method, comprising:
  obtaining, by a radio access point (AP), service information provided by a service provider;
  adding a service information indicator having a first state and a second state to a beacon
frame, wherein the service information indicator is in the first state when the beacon frame carries the service information to indicate to a terminal that the beacon frame carries the service information, and wherein the service information indicator is in the second state when the beacon frame does not carry the service information to indicate to the terminal that the beacon frame does not carry the service information;
adding the service information to the beacon frame;
adding a time interval indication parameter to a currently broadcast beacon frame, wherein the time interval indication parameter is used to indicate to a terminal a broadcast interval between a next beacon frame that carries the service information and the currently broadcast beacon frame, wherein the currently broadcast beacon frame and the next beacon frame are nonconsecutive beacon frames; and
broadcasting the beacon frame.

Column 15, Line 51, Claim 17 should read:
A terminal, comprising:
  a memory storing executable instructions; and
a processor coupled to the memory and configured to:
obtain a beacon frame that carries service information according to a service information indicator and a time interval indication parameter carried in the beacon frame, wherein the service information indicator is in a first state when the beacon frame carries the service information to indicate to the terminal that the beacon frame carries the service information, wherein the time interval indication parameter is used to indicate to the terminal a broadcast interval between a next beacon frame that carries the service information and a currently broadcast beacon frame, wherein the currently Signed and Sealed this
Twenty-first Day of February, 2017

Michelle K. Lee
*Director of the United States Patent and Trademark Office* broadcast beacon frame and the next beacon frame are nonconsecutive beacon frames, and wherein the service information indicator is in a second state when the beacon frame does not carry the service information to indicate to the terminal that the beacon frame does not carry the service information; and extract and output the service information from the beacon frame.